United States Patent [19]
Hobson, Jr.

[11] 3,787,708
[45] Jan. 22, 1974

[54] MONITOR SYSTEM FOR GROUND FAULT RELAY

[75] Inventor: Charles F. Hobson, Jr., Southington, Conn.

[73] Assignee: General Electric Company, New York, N.Y.

[22] Filed: Jan. 2, 1973

[21] Appl. No.: 320,537

[52] U.S. Cl.............. 317/18 D, 317/27 R, 324/51
[51] Int. Cl. ............................................ H02h 3/26
[58] Field of Search.......... 317/18 D, 27 R; 324/51; 340/255, 253 H, 253 N

[56] References Cited
UNITED STATES PATENTS
3,407,337  10/1968  Benham.......................... 317/18 D Primary Examiner—J. D. Miller
Assistant Examiner—Harvey Fendelman
Attorney, Agent, or Firm—John M. Prutzman et al.

[57] ABSTRACT

A ground fault responsive protection system having a ground fault trip relay operable by a ground fault current sensor for operating a circuit interrupter when the ground fault current reaches a pre-established trip level and a monitoring system operable for testing the operation of the ground fault trip relay with selective operation of the circuit interrupter.

6 Claims, 1 Drawing Figure

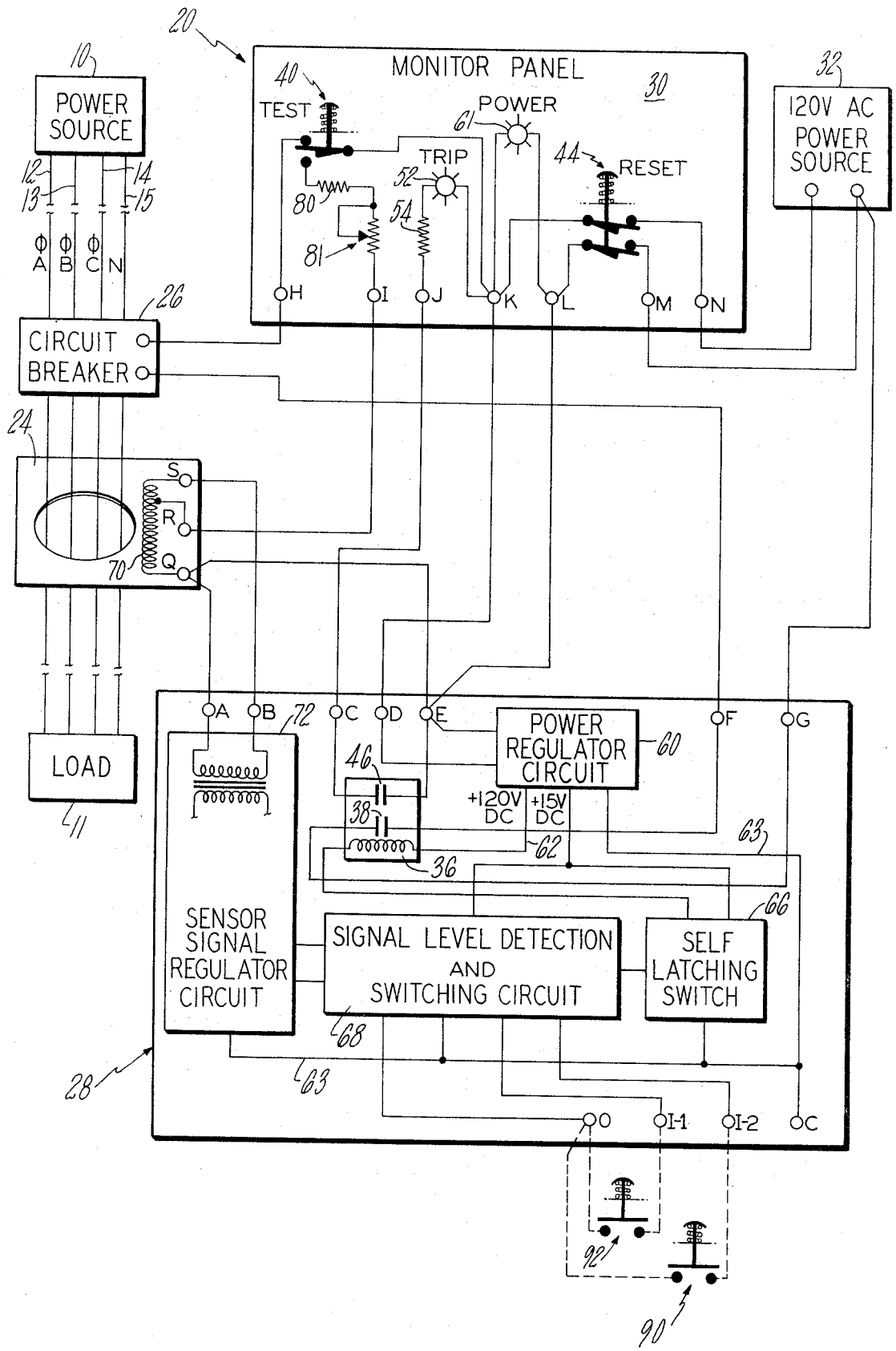

MONITOR SYSTEM FOR GROUND FAULT RELAY

BRIEF SUMMARY OF THE INVENTION

The present invention relates generally to ground fault responsive protection systems for electric power distribution systems and more particularly to monitoring systems for monitoring and testing the operation of ground fault responsive protection systems.

It is a principal aim of the present invention to provide a new and improved monitoring system for monitoring and testing the ground fault trip relay of a ground fault responsive protection system and operable for testing the ground fault trip relay with selective operation of the circuit interrupter of the protection system.

It is another aim of the present invention to provide a new and improved monitoring system for a ground fault responsive protection system which is simple to operate for testing the ground fault trip relay of the protection system. In accordance with the present invention, the monitoring system upon the completion of any test automatically reconditions the ground fault responsive protection system for normal operation.

It is a further aim of the present invention to provide a new and improved monitoring system for a ground fault responsive protection system having just two manually operable switches which may be selectively operated in accordance with one sequence of operations for testing the ground fault trip relay without operating the circuit interrupter of the ground fault protection system and in accordance with another sequence of operations for operating the circuit breaker in conjunction with testing the ground fault trip relay.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWING

The FIGURE is a schematic representation of an electric power distribution system having a ground fault responsive protection system incorporating an embodiment of the monitoring system of the present invention.

DESCRIPTION OF THE PREFERRED EMBODIMENT

Referring now to the drawing in detail, an electric power distribution system is shown comprising a three phase power source 10 electrically connected for supplying electrical power to a load 11 via a power line consisting of phase conductors 12-14 and a neutral conductor 15. A ground fault responsive protection system 20 is shown provided for protecting the power distribution system against an excessive ground fault current level and to interrupt the power line circuit when any such ground fault occurs. The ground fault responsive protection system is shown comprising a conventional ground fault current sensor 24, a circuit breaker type interrupter 26, an overcurrent or ground fault trip relay 28 and a monitoring system having a monitor panel 30. The components of the ground fault responsive protection system have suitable terminals (designated in part by the letters A-N and Q-S) for electrically interconnecting the components and for electrically connecting the ground fault responsive protection system to a suitable power source 32. In the shown embodiment, the power source 32 provides for supplying 120V AC power for normal operation of the protection system and also for testing the ground fault protection system as hereinafter described.

Excepting as hereinafter specifically pointed out, the shown ground fault trip relay 28 is substantially identical to the ground fault trip relay shown and described in detail in the United States patent application of Charles F. Hobson, Jr. et al entitled Ground Fault Responsive Protection System, Ser. No. 320,538 and filed concurrently herewith, and the ground fault trip relay 28 will therefore not be described in detail. Briefly, however, the ground fault trip relay 28 comprises an interrupter relay 36 which during normal operation of the ground fault protection system is adapted to be energized to connect the power source 32 to the circuit breaker 26 to trip the circuit breaker and thereby open the electrical circuit to the load 11. More particularly, it can be seen that when the relay 36 is energized and the relay switch 38 is thereupon closed, the 120V AC power source 32 is electrically connected to the circuit breaker 26 via terminals F,G of relay 28, terminals H, N of monitor panel 30 and the normally closed monitor panel circuit between terminals H, N comprising a push button test switch 40 and a push button reset switch 44. (The relay switch 38 and the relay terminals F, G are employed for the purpose of the present invention and they are not shown in the ground fault trip relay in the aforementioned concurrently filed United States patent application.)

When the relay 36 is energized, the relay switch 46 supplies 120V AC power for energizing a trip lamp 52 of the monitor panel 30 and shown connected via a suitable resistor 54 (which is provided to permit a low voltage lamp to be used) to the terminals J, K of the monitor panel. The lamp 52 when lit indicates that the relay 36 is energized and during normal operation of the ground fault responsive protection system that the circuit breaker 26 has been tripped.

The 120V AC power source 32 is connected for supplying electrical power to a power regulator circuit 60 of the trip relay 28 via terminals M,N of the monitor panel 30, reset switch 44, monitor panel terminals K, L and terminals D, E of the trip relay 28. A lamp 61 is provided at the monitor panel for indicating when the power source is so connected for supplying power to the trip relay 28. As described in the aforementioned concurrently filed United States patent application, the power regulator circuit 60 provides for supplying 120V DC power via the leads 62, 63 for operating the relay 36 and 15V DC control power via leads 63, 64 for operating a solid state control circuit comprising a self-latching switch 66 for the relay 36 and a signal level detection and switching circuit 68.

The ground fault sensor 24 comprises a suitable iron core (not shown) having a window through which the conductors 12-15 pass and a coil 70 around a portion of the core for generating a ground fault signal which is substantially proportional to the ground fault current. The ends of the coil 70 are connected to the terminals Q,S of the sensor 24 and a test terminal R of the sensor 24 is connected to a suitable intermediate point of the coil for test purposes. The terminals Q, S of the sensor 24 are connected to the relay terminals A, B for connecting the sensor to a sensor signal regulator circuit 72 of the ground fault trip relay 28. The regulator circuit 72 is in turn connected to the ground lead 63 of the relay and to the signal level detection and switching circuit 68 such that when the sensor generated signal reaches a preestablished detection level (which is manually adjustable with the relay 28) the self-latching switch 66 is switched to its conductive state to energize the relay 36. The self-latching switch 66 thereafter remains in its conductive state to maintain the relay 28 in an active state for operating the circuit breaker 26 until the reset switch 44 is actuated to deenergize the ground fault trip relay 28.

The ground fault trip relay 28 is shown comprising four control terminals shown identified by the symbols "0", "I-1", "I-2", and "C" for interconnecting the relay with other ground fault trip relays of a multi-zone ground fault responsive protection system, all as described in the aforementioned concurrently filed United States patent application. Briefly, however, the "0" terminal is connected internally for being automatically connected to the ground lead 63 and to thereby generate a ground signal when the ground fault signal reaches the detection level; the "I—1" terminal is connected internally so that when it is grounded to the lead 63, it switches the relay 28 to a time delay mode of operation; the terminal mode of operation; the terminal "I-2" is connected internally so that when it is grounded to the lead 63 the relay 28 is deactivated; and the "C" terminal is provided for interconnecting the ground leads 63 of the ground fault trip relays 28 of the multi-zone system to establish a common ground.

The monitor panel circuit is shown in the drawing in its normal condition with the push button reset switch 44 in its normal or released position and with the push button test switch 40 in its normal or released position. Both switches 40, 44 are suitably spring biased to be automatically returned to their normal positions when released. For testing substantially the complete ground fault current protection system, the test switch 40 is manually depressed to initially break the electrical connection to the circuit breaker 26 and to thereafter complete a circuit for supplying electrical power from the power source 32 via reset switch 44, test switch 40, a calibration resistor 80 and a linear potentiometer 81 to terminals Q, R of the sensor 24. A ground fault test signal is thereby generated between the terminals Q, S of the sensor 24 for operating the ground fault trip relay 28. The calibration resistor 80 provides for setting a maximum test signal level above the highest detection level which may be manually pre-established with the ground fault trip relay 28, and the linear potentiometer 81 provide for manually setting a lower test signal level for testing the signal detection level of the relay 28.

Where the ground fault test signal is above the detection level of the relay 28, the relay 28 would be activated to switch the self-latching switch 66 to its conductive state and thereby energize the relay 36. The trip lamp 52 would then be energized to indicate that the ground fault trip relay is working properly. If it is then desired to check the operation of the circuit breaker 26 with the ground fault trip relay 28, the test switch 40 merely has to be released, whereupon the power source 32 is connected via the closed relay switch 38 of the still active ground fault trip relay 28 and the test switch 40 for tripping the circuit breaker 26. Where the circuit breaker 26 is tripped, the system can then be reconditioned for normal operation merely by momentarily depressing the reset switch 44 to deenergize the relay 28 and then manually closing the circuit breaker 26. If it is preferred that the circuit breaker 26 is maintained closed, for example to assure maintanence of the electrical connection to the load 11, it is merely necessary to depress the reset switch 44 and hold it depressed before releasing the test switch 40. With that sequence of operation of the switches 40, 44, the reset switch will first disconnect the power source from the ground fault current protection system to deenergize the relay 36 and the test circuit to prevent tripping the circuit breaker 26 when the test switch 40 is released.

Additional auxiliary test circuits 90, 92 are shown in broken lines for testing the proper operation of the internal relay controls connected to the "0", "I-1" and "I-2" relay terminals. These tests can be individually performed along with the previously described test circuit by first holding closed the selected test circuit 90, 92 with its push button switch and then depressing the test switch 40. Where the auxiliary test circuit 92 is held closed, the relay 28 would be switched to its delay mode of operation such that the relay 36 and trip lamp 52 are energized after the time delay manually pre-established with the relay 28. Where the auxiliary test circuit 90 is held closed, the relay 28 would remain inactivated and the relay 36 would remain deenergized.

Thus, it can be seen that the monitoring system provides for quickly and easily testing substantially all of the circuits of the ground fault current protection system. The monitoring system provides for testing the ground fault trip relay with or without tripping the circuit breaker as desired. Upon completion of any of the tests, the monitoring system remains in condition for normal operation of the ground fault current system and such that the protection system cannot be inadvertently left in an inoperative condition.

As will be apparent to persons skilled in the art, various modifications, adaptations and variations of the foregoing specific disclosure can be made without departing from the teachings of the present invention.

I claim:

1. In a ground fault responsive protection system for operating a circuit interrupter of an electrical distribution system for opening the circuit interrupter upon the occurrence of a ground fault current of a pre-established level and comprising ground fault signal generating means for generating a ground fault signal having a signal level which varies with the ground fault current, electrical power source means, control means adapted to be energized by the electrical power source means and adapted while energized for being activated by a ground fault signal above a pre-established detection level for operating the circuit interrupter and a monitoring system for selectively testing the operation of the ground fault responsive protection system, the improvement wherein the monitoring system comprises first circuit means for connecting the electrical power source means for energizing the control means and having a reset switch operable for selectively deenergizing the control means, and second circuit means for alternatively connecting the electrical power source means to the signal generating means for generating a ground fault test signal above the pre-established detection level and connecting the circuit interrupter for being operated by the control means and having a second test switch manually operable between two operating positions thereof for providing said alternative connections.

2. A ground fault responsive protection system according to claim 1 wherein the reset switch and test switches are push button switches connected respectively for being depressed for deenergizing the control means and for connecting the electrical power source means to the signal generating means for generating said ground fault test signal.

3. A ground fault responsive protection system according to claim 1 wherein the second circuit means comprises manually settable control means for setting the ground fault test signal level for testing the pre-established detection level of the ground fault relay.

4. In a ground fault responsive protection system for operating a circuit interrupter of an electrical distribution system for opening the circuit interrupter upon the occurrence of a ground fault current of a pre-established level and comprising a ground fault sensor for generating a ground fault signal having a signal level which varies with the ground fault current, electrical power source means, a ground fault trip relay connected to the ground fault sensor and adapted to be energized by the power source means and operable while energized to be activated by a ground fault signal above a pre-established detection level to operate the circuit interrupter, and a monitoring system for selectively testing the operation of the ground fault responsive protection system by selectively connecting the power source means for energizing the ground fault relay and for energizing the ground fault sensor for generating a ground fault test signal above the detection level, the improvement wherein the monitoring system comprises a first reset switch having a normal position for connecting the ground fault relay for being energized by the electrical power source means and operable for deenergizing the ground fault relay, and a second test switch having a first normal position for connecting the ground fault relay for operating the circuit interrupter and a second position for connecting the electrical power source means to the ground fault sensor for producing a ground fault test signal above the detection level, whereby by switching the second test switch from its first normal position to its second position the operation of the ground fault relay can be tested without opening the circuit interrupter and the operation of the circuit interrupter by the relay can then be tested by returning the second test switch to its first normal position without first operating the first reset switch for deenergizing the ground fault relay and such test operation of the circuit interrupter can be avoided by operating the first reset switch for deenergizing the ground fault relay and with the ground fault relay deenergized returning the second test switch to its normal position.

5. A ground fault responsive protection system according to claim 4 wherein the monitoring system comprises manually adjustable means for setting the level of the ground fault test signal for testing the detection level of the ground fault relay when the test switch is switched to generate a ground fault test signal.

6. A ground fault responsive protection system according to claim 4 wherein the reset and test switches are momentary contact, spring return switches adapted to be manually actuated for switching them from their normal positions.

* * * * *